(12) United States Patent
Le Moal et al.

(10) Patent No.: US 9,712,085 B2
(45) Date of Patent: Jul. 18, 2017

(54) ACTUATION DEVICE WITH A DRIVE ELEMENT ACTUATED BY CRAWLING

(71) Applicants: SILMACH, Besancon (FR); CENTRE NATIONAL DE LA RECHERCHE SCIENTIFIQUE (CNRS), Paris (FR); UNIVERSITE DE FRANCHE-COMTE, Besancon (FR)

(72) Inventors: Patrice Le Moal, Besancon (FR); Gilles Bourbon, Besancon (FR); Patrice Minotti, Gennes (FR); Paul Vescovo, Besancon (FR)

(73) Assignees: SILMACH, Besancon (FR); CENTRE NATIONAL DE LA RECHERCHE SCIENTIFIQUE (CNRS), Paris (FR); UNIVERSITE DE FRANCHE-COMTE, Besancon (FR)

( * ) Notice: Subject to any disclaimer, the term of this patent is extended or adjusted under 35 U.S.C. 154(b) by 735 days.

(21) Appl. No.: 14/091,223

(22) Filed: Nov. 26, 2013

(65) Prior Publication Data

US 2014/0292137 A1 Oct. 2, 2014

(30) Foreign Application Priority Data

Nov. 26, 2012 (FR) ...................................... 12 61248

(51) Int. Cl.
*H02N 1/00* (2006.01)
(52) U.S. Cl.
CPC .............. *H02N 1/008* (2013.01); *Y10T 29/41* (2015.01)

(58) Field of Classification Search
CPC ...................................................... H02N 1/008
USPC ......... 310/300, 309, 310; 200/181; 318/116; 322/2 A
See application file for complete search history.

(56) References Cited

U.S. PATENT DOCUMENTS

| 2007/0069604 A1* | 3/2007 | Bourbon | ................. H02N 1/008 310/309 |
| 2008/0150391 A1* | 6/2008 | Le Moal | ................. H02N 1/008 310/309 |

FOREIGN PATENT DOCUMENTS

| FR | 2 852 111 A1 | 9/2004 |
| FR | 2 883 276 A1 | 9/2006 |

* cited by examiner

*Primary Examiner* — Thomas Truong
(74) *Attorney, Agent, or Firm* — Blakely Sokoloff Taylor & Zafman LLP

(57) ABSTRACT

An actuation device (1) which includes an actuation element (3) with a fixed 10 portion (31) and a driving portion (32); wherein the fixed portion (31) includes a crawling surface (311). The driving portion (32) includes a flexible moveable blade (321) positioned in parallel and at a distance from the crawling surface (311). When a power supply voltage is applied between the moveable blade (321) and the crawling surface (311), the free end (3211) comes into contact with the crawling surface (311), and a contact area, between the moveable blade (321) and the crawling surface (311), increases by propagation of the crawling front (3213) along the moveable blade (321). The propagation of the crawling front displaces the moveable blade (321) according to a first orientation.

13 Claims, 7 Drawing Sheets

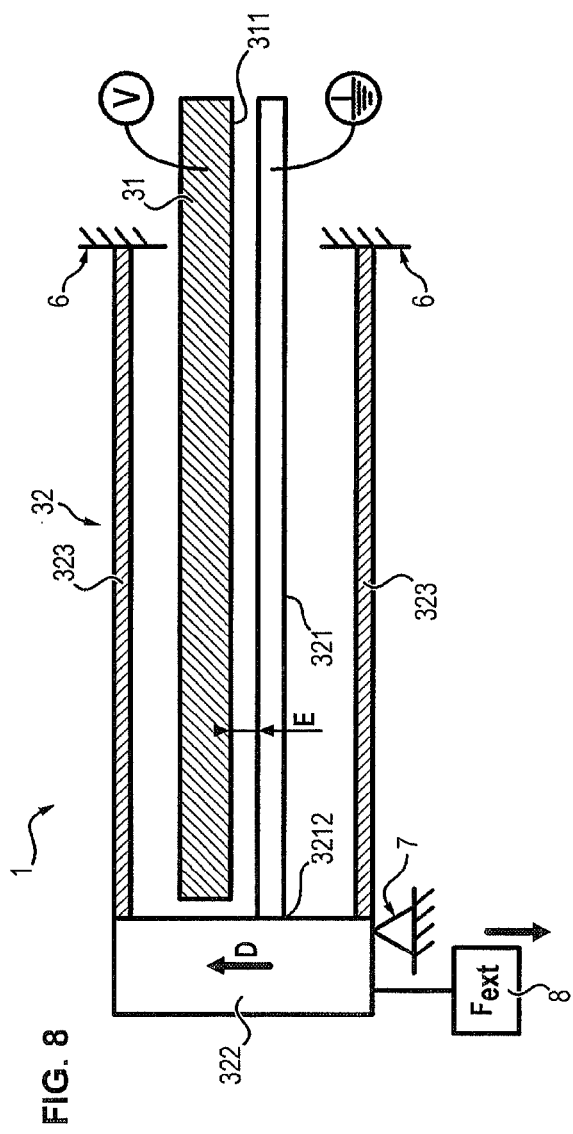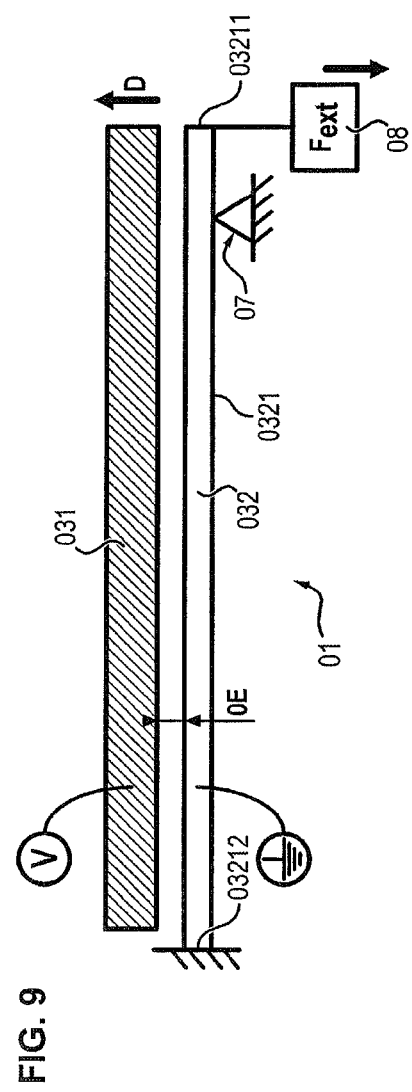

ACTUATION DEVICE WITH A DRIVE ELEMENT ACTUATED BY CRAWLING

TECHNICAL FIELD

The subject matter here is in the field of electrostatic actuation devices for setting an element to be driven into motion. In particular, the subject matter here is in the field of electrostatic MEMS actuation devices for setting an element to be driven into motion, for example a micro-toothed element by means of a periodic meshing mechanism.

STATE OF THE ART

Electrostatic actuation devices may be divided in two main groups:
- actuation device said to be with <<normal electrodes>>; and
- actuation devices said to be with <<interdigitated combs>>.

An actuation device with interdigitated combs comprises a fixed comb including a bearing, to which a plurality of fingers is connected, and a moveable comb also including a bearing, to which a plurality of fingers is connected. The fingers of each of the combs are spaced apart pairwise by a regular gap, the width of which is greater than the width of the fingers. The fixed comb and the moveable comb inter-penetrate each other; i.e. the fingers of the moveable comb penetrate the regular gaps present between the fingers of the fixed comb and vice versa. During operation of the actuation device, a power supply voltage is applied between the moveable comb and the fixed comb; i.e. the power supply voltage is applied between the bearings and the main electric field generated between these bearings is collinear with the fingers. The power supply voltage forces the fingers of the moveable comb to penetrate the gaps separating the fingers of the fixed comb.

The forces which may be generated by actuation devices with interdigitated combs are inversely proportional to the gap between the fingers of the moveable comb and the fingers of the fixed comb. These interdigitated comb actuation devices generate stroke steps which may be at least equal to the step of an element to be driven of the <<rack>> type or <<micro-toothed wheel>>, with limited driving forces, as compared with actuation devices with normal electrodes.

The drawbacks of these actuation devices with interdigitated combs are mainly the limited level of the available driving forces, mentioned above, and the transverse instability of the moveable comb(s) caused by imbalance of parasitic attraction forces between the fingers of the combs induced by the lesser dissymmetry of the gaps between a finger of the moveable comb and the two corresponding fingers of the fixed comb.

Actuation devices with normal electrodes are not subject to transverse instability since the electrodes do not comprise any interdigitated fingers which extend collinearly with the main applied electric field due to the power supply voltage between the electrodes. Therefore there are no lateral parasitic electrostatic forces.

An actuation device with normal electrodes comprises a fixed electrode and a moveable electrode to which a drive element is connected. Each of the electrodes usually has a right-angled parallelepipedal shape. The electrodes are positioned so that an actuation face of the fixed electrode is facing an actuation face of the moveable electrode. During operation of the actuation device, a power supply voltage is applied between the actuation face of the fixed electrode and the actuation face of the moveable electrode. The electric field forces both actuation faces to move closer to each other: the moveable electrode moves closer to the fixed electrode.

The actuation devices with more electrodes generate forces inversely proportional to the square of the gap, also called an air gap, present between both electrodes, the gap being generally equal to the travel of the moveable electrode. Thus, for a same air gap, the driving forces generated by the actuation devices with normal electrodes are much greater than the driving forces generated by the actuation devices with interdigitated combs.

As a counterpart, the actuation devices with normal electrodes set into play a much more limited travel of the moveable electrode towards the fixed electrode than the actuation devices with interdigitated combs, of the order of only a few microns. This limited travel does not give the possibility of contemplating the design of an actuation device with normal electrodes capable of driving in a stepping mode a moveable element of the <<rack>> type or <<toothed wheel>> given that the smallest step which may be made technologically for the moveable element remains much greater than the travel of the moveable electrode of the actuation devices with normal electrodes.

Moreover, the actuation devices with normal electrodes appear according to two configurations:
- actuation devices without any contact between the fixed electrode and the moveable electrode, the contact being prevented by the presence of abutments insulated relatively to the potential of the fixed electrode and necessarily at the same potential as the moveable electrode;
- actuation devices with contact between the fixed electrode and the moveable electrode, which requires the presence of an insulator on the actuation face of the fixed electrode and/or that of the moveable electrode.

The contactless configuration complicates the making of the actuation device since the insulated abutments have to be fitted into the substrate of the latter, generally in silicon, and act as a frame to the actuation device.

The contactless configuration leads to adhesion (called <<stiction>>) problems between the electrodes because of the presence of residual electric charges. This adhesion, even temporary (waiting for the discharge of electric charges), may reduce the frequency with which the moveable electrode moves closer to the fixed electrode. Therefore it also limits the mechanical power of the actuation device since the latter is proportional to the frequency of the actuation.

Presentation

An object is therefore to overcome at least one of the drawbacks of the prior art shown above.

For this, an actuation device is proposed for setting an element to be driven into motion, comprising:
- a drive element which may be put into contact with the element to be driven; and
- an actuation element comprising a fixed portion and a driving portion for the drive element;

wherein the fixed portion includes a crawling surface, the driving portion includes a flexible moveable blade with a given width positioned in parallel and at a distance from the crawling surface, the moveable blade having a free end and an end connected to the drive element;

wherein the length of the moveable blade is selected so that, when a power supply voltage is applied between the moveable blade and the crawling surface, the free end will come into contact with the crawling surface and that a contact surface area, between the moveable blade and the crawling surface, longitudinally delimited relatively to the moveable blade by the free end of the moveable blade and a crawling front, increases by propagation of the crawling front along the moveable blade, the propagation of the crawling front moving the moveable blade along a first direction, thereby driving the drive element.

By generating a crawling front and by propagating it along the moveable blade, it is possible to generate substantially larger forces than those generated by the actuation devices with normal electrodes and/or with interdigitated combs of the prior art.

The subject matter is also an actuation device for setting into motion an element to be driven comprising:
  a drive element able to be put into contact with the element to be driven; and
  an actuation element comprising a fixed portion and a driving portion by the drive element;
  wherein the fixed portion includes a contact surface (also called a crawling surface), the driving portion includes a moveable blade and an elastic return element distinct from the moveable blade and connected to the latter,
  the elastic return element and the moveable blade being laid out so that the moveable blade is able to be displaced along a first displacement sense along a first direction when a power supply voltage is applied between the moveable blade and the contact surface, and to be displaced along a second displacement sense along the first direction and opposite to the first displacement sense when the power supply voltage is cut off,
  and in such a way that when the power supply voltage is applied, the moveable blade drives the elastic return element in its displacement in the first displacement sense, the elastic return element storing energy,
  and that, when the power supply voltage is cut off, by means of a return force generated from the stored energy, the elastic return element displaces the moveable blade in the second displacement sense.

The production of such a reciprocal motion imparted to the driving element allows the stepped setting into motion according to a translation or a rotation of the element to be driven of the <<rack>> type or <<toothed wheel>>.

Other optional features of this actuation device are described hereafter in the description portion.

DRAWINGS

Other objects, features and advantages will become apparent upon reading the description which follows with reference to the drawings given as an illustration and not as a limitation, wherein.

Figure 1:
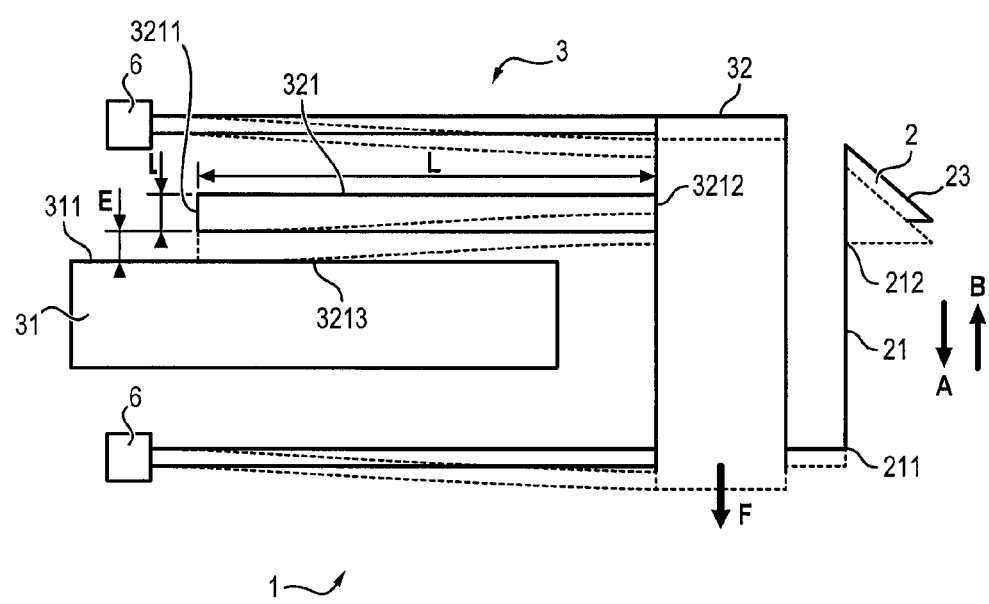
FIG. 1 is a schematized illustration of an actuation device, the fixed portion and the driving portion of which respectively comprise a single balk bearing a crawling surface and a single flexible moveable blade.
Figure 2:
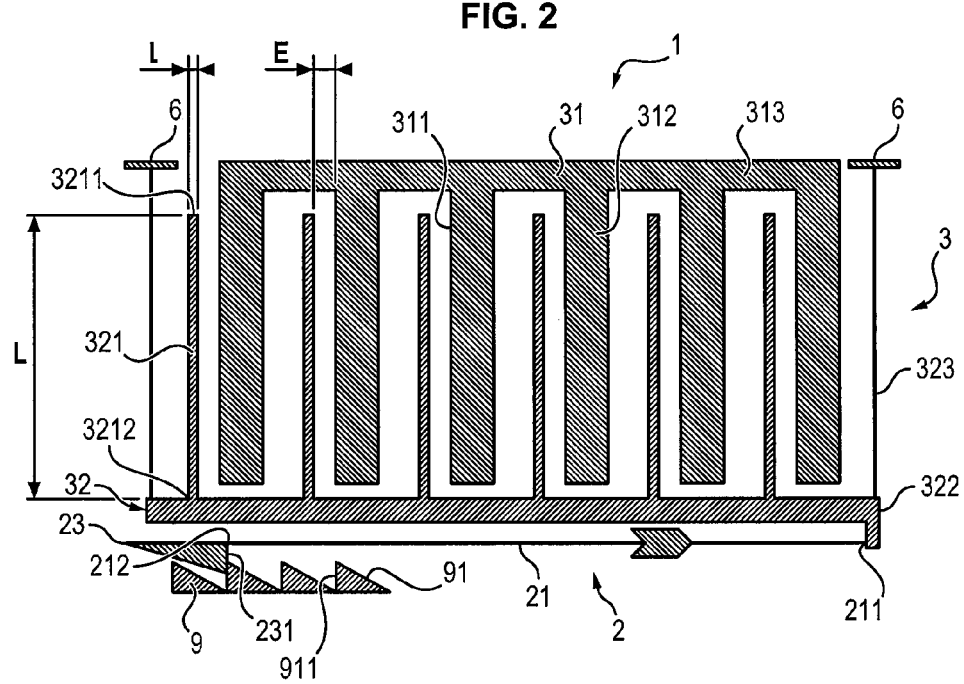
FIG. 2 is a schematized illustration of an actuation device, the fixed portion and the driving portion of which respectively comprise a plurality of balks, each balk bearing a crawling surface, and a plurality of flexible moveable blades, in the rest position, in which the driving element is displaced along the same direction as the driving portion.
Figure 3:
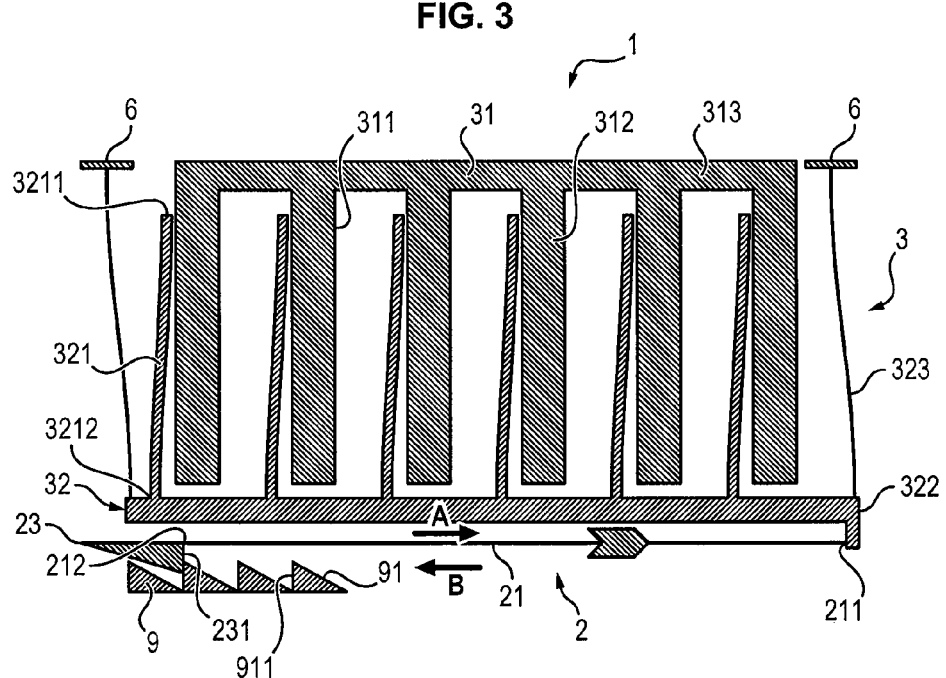
FIG. 3 is a schematized illustration of the actuation device, the flexible moveable blades having been subject to crawling on the corresponding crawling surfaces.
Figure 4:
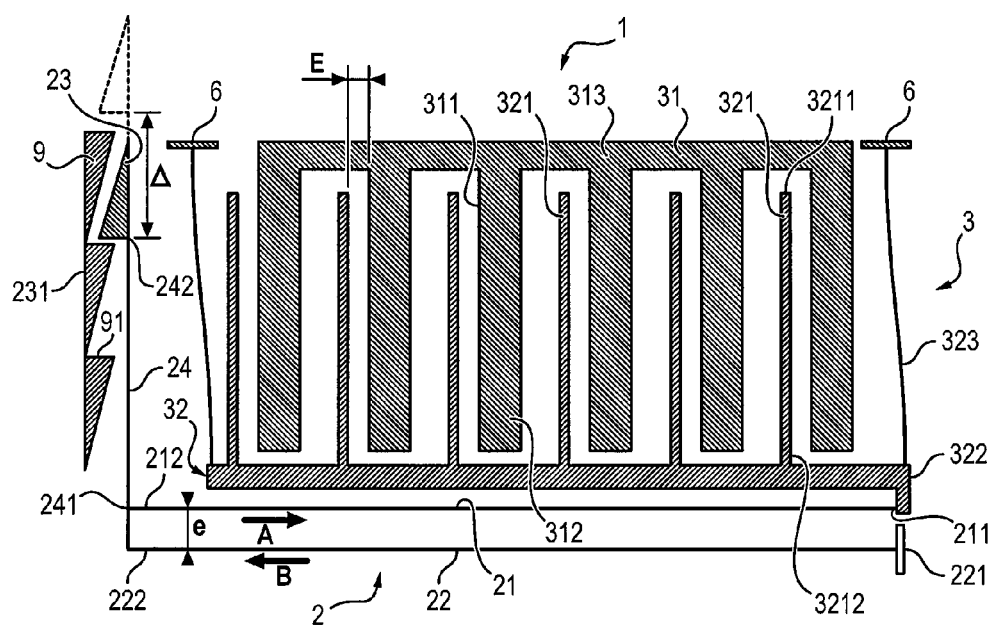
FIG. 4 is a schematized illustration of an actuation device, the fixed portion and the driving portion of which respectively comprise a plurality of balks, each balk bearing a crawling surface, and a plurality of flexible moveable blades, in the rest position, in which the driving element is displaced along a direction perpendicular to the displacement direction of the driving portion.
Figure 5:
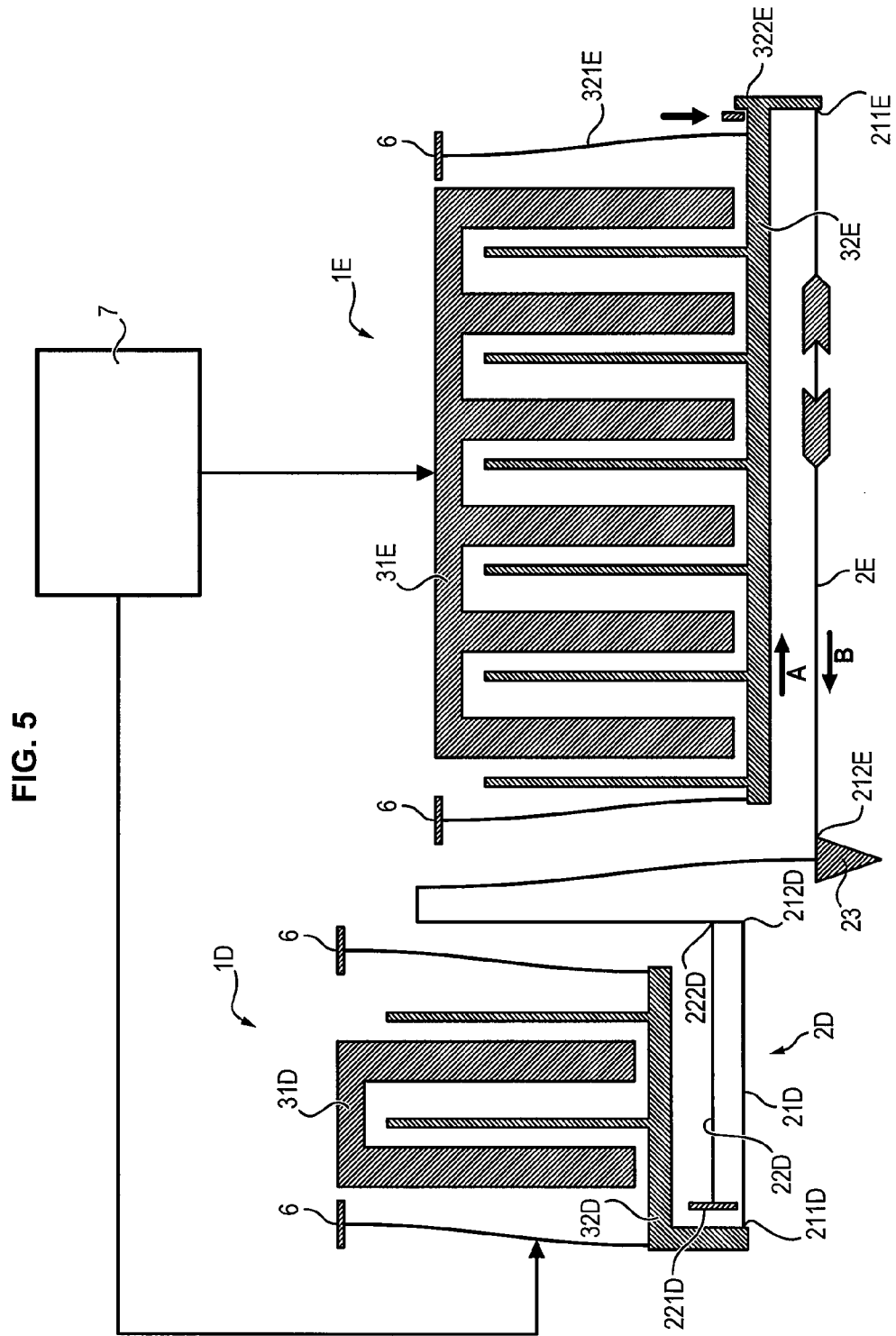
FIG. 5 is a schematized illustration of a driving assembly comprising two actuation devices, one allowing displacement of a finger by its drive element according to a first direction and the other one allowing disengagement of the drive element along a direction substantially perpendicular to the first direction.
Figure 7:
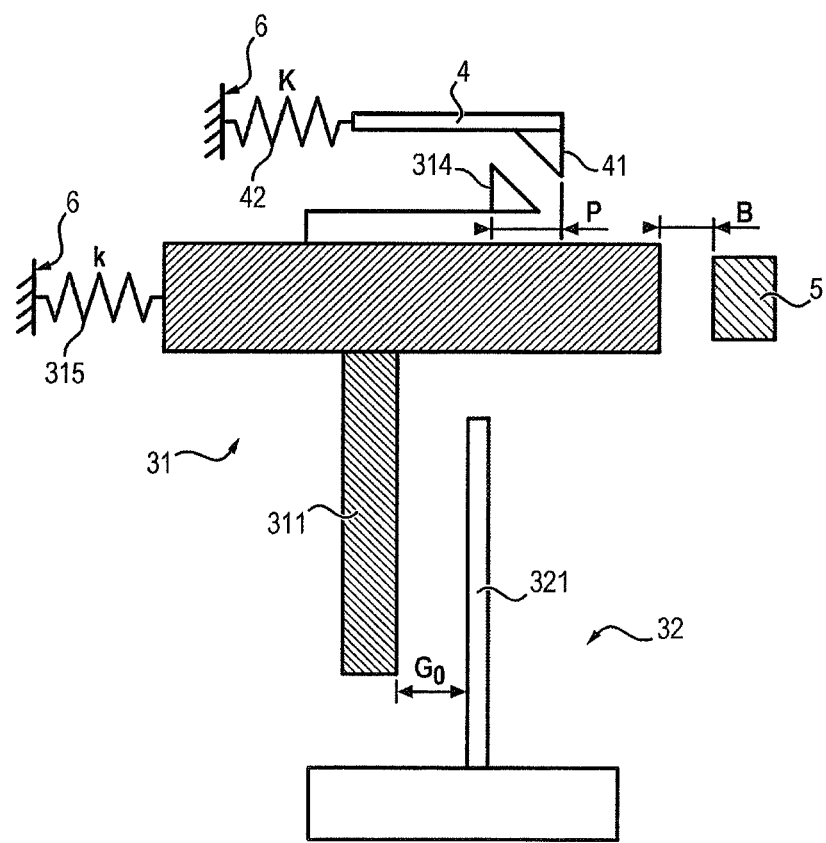

FIG. 7 schematically illustrates the mounting method with catching up of the etching play;

FIG. 8 schematically illustrates an actuation device corresponding to the device of FIG. 1 but modified so as to allow a measurement of the maximum resistance load which may be driven over the entirety of the displacement of the driving portion; and FIG. 9 schematically illustrates an actuation device of the prior art, modified so as to allow measurement of the maximum resistant load which may be driven over the entirety of the displacement of the driving portion.

DESCRIPTION

Actuation Device

An actuation device which is considered here is described hereafter with reference to FIGS. 1 to 4. This actuation device is mainly intended to be formed by etching on a silicon substrate.

This actuation device 1 allows the setting into motion of an element to be driven 9. The element to be driven 9 may for example be a device with a rack or a toothed wheel comprising a plurality of notches or teeth 91.

The actuation device 1 comprises a drive element 2 able to be put into contact with the element to be driven 9. The actuation device 1 also comprises an actuation element 3. The actuation element 3 includes a fixed portion 31 including a crawling surface 311 and a driving portion 32 including a moveable blade 321 and capable of setting into motion the drive element 2.

The moveable blade 321 has a given width 1 and is positioned in parallel and at a distance from the crawling surface 311. The width 1 is the dimension of the smallest moveable blade on the plane of its displacement. The moveable blade 321 and the crawling surface 311 form an air gap E in which an electric field prevails when a power supply voltage, i.e. a difference of potentials in the air gap E, is applied across them.

The moveable blade 321 has a free end 3211 and an end 3212 bound to the drive element 2. The length L of the moveable blade is selected so that when a power supply voltage is applied between the moveable blade 321 and the crawling surface 311, the free end 3211 comes into contact with the crawling surface 311 and that a contact area between the moveable blade 321 and the crawling surface 311 increases by propagation of the crawling front along the moveable blade 321. This contact area is delimited longitudinally, relative to the moveable blade 321, by the free end 3211 of the moveable blade and the crawling front. The propagation of the crawling front allows displacement of the driving portion 32 along a first direction (arrow A). The driving portion 32 in turn causes displacement of the drive element 2.

The crawling front moves from the free end 3211 of the moveable blade towards the end 3212 bound to the drive element 2.

The moveable blade 321 is flexible and is electrically insulated from the crawling surface 311. The term of <<flexible>> is understood here as referring to a moveable blade, the flexibility of which is sufficient so that a crawling front appears and propagates on the crawling surface.

Advantageously, for a given width 1 of the moveable blade 321 and a given power supply voltage, the length L of the moveable blade 321 is minimum while ensuring sufficient flexibility for allowing the formation of a crawling front.

This dimensioning is advantageous in terms of forced density since the increase in the length L of the moveable blade 321 beyond this minimum value obviously meets the condition of sufficient flexibility but does not induce any additional gain in driving force. The portion of the moveable blade 321 beyond the minimum value forms a non-driving portion of the latter.

The term of <<driving force>> represents here the force generated upon the formation of the crawling front before its propagation along the crawling surface 311. To summarize, this is the initial generated driving force.

According to the same criterion to be met, i.e. ensuring sufficient flexibility in order to allow the formation of a crawling front, the width 1 of the moveable blade 321 may further be maximum for a given length L of the moveable blade 321 and a given power supply voltage.

This dimensioning is advantageous in terms of driving force transmitted to the driving element 2. Indeed, the reduction in the width 1 of the moveable blade 321 causes an increase in the flexibility which leads to a reduction of the driving force. The flexibility of the moveable blade 321 is then too large for transferring the entirety of the driving force available to the drive element 2.

The relationship between the width 1 of the moveable blade 321 and the initial driving force which may be transmitted to the drive element 2 is shown in the table below, for two different power supply voltages, 100 V and 150 V respectively, all parameters being moreover equal (blade length L equal to 1,000 μm and air gap of 10 μm).

TABLE 1

| Generated driving force (μN) | | Power supply voltage | |
|---|---|---|---|
| | | 100 V | 150 V |
| Width (μm) | 5 | 1035 | 1909 |
| | 7.5 | 1404 | 2574 |
| | 10 | 1740 | 3197 |
| | 12.5 | 105 | 3781 |
| | 15 | 92 | 4324 |
| | 17.5 | 88 | 221 |
| | 20 | 86 | 206 |
| | 22.5 | 85 | 199 |
| | 25 | 85 | 196 |

By means of this Table 1, two particular areas and a transition may be observed:
- a first flexibility area of the moveable blade 321 in which the driving force gradually increases with the width 1 of the moveable blade;
- a sudden transition revealing a significant drop in the driving force; and
- a second rigidity area of the moveable blade in which the driving force is constant and assumes a non-flexible moveable blade.

The contact area increases until it attains a limiting value for a given power supply voltage. It is therefore advantageous to select the flexibility of the moveable blade 321 so that the limiting value is minimized for the given power supply voltage, the driving portion 32 being assumed to be fixed (or blocked).

The minimization of the limiting value of the contact area is in direct relation with the selection of the maximum width or of the minimum length of the moveable blade 321 for a given length or width respectively satisfying sufficient flexibility.

Thus, when a power supply voltage is applied, the moveable blade 321 is deformed and moves closer to the crawling surface 311, which causes a displacement of the driving portion 32 along a first displacement sense (arrow A) along the first direction.

The driving portion 32 may comprise an elastic return element 323 connected to the drive element 2 and to a frame of the actuation device 1.

The moveable blade 321 is therefore capable of being displaced along a first displacement direction when the power supply voltage is applied. During this displacement along the first direction, the elastic return element 323 stores energy.

Next, when the power supply voltage is cut off, the elastic return element 323 displaces the moveable blade 321 along a second displacement sense (arrow B), opposite to the first sense, by means of a return force generated by the elastic return element 323 from the energy stored earlier.

The displacement of the moveable blade 321 successively and iteratively along the first displacement sense (arrow A) and then along the second displacement sense (arrow B), by the cyclic application of the power supply voltage, generates a reciprocal movement of the drive element 2.

The elastic return element 323 gives the possibility of transmitting to the drive element 2 a sufficient force so that the latter may be the element to be driven 9 when the driving portion 32 is moved along the second displacement sense. Indeed, without the elastic return element 323, only the force transmitted to the drive element 2 during the displacement of the driving portion 32 along the first displacement sense is sufficient for being able to displace the element to be driven 9.

Further, the elastic return element 323, by the stored energy, participates in the return to the initial position of the flexible blade 321. The force generated in the second displacement sense may also be transmitted. Both of these facts give the possibility of displacing the drive element 2 in the same displacement direction but according to the sense opposite to the first sense while generating a sufficient force for displacing the element to be driven 9 through the drive element 2. Moreover, the electric return element 323, by generating the mentioned force, also contributes to the detachment of the moveable blade 321 from the crawling surface 311. Indeed, when the power supply voltage is cut off, the residual charges remain present for a moment on the contact area between the moveable blade 321 and the crawling surface 311, which delays the detachment of the moveable blade 321 and its return to its starting position. The return force generated by the elastic return element 323 acts along one direction and in a sense favorable to the detachment of the moveable blade 321, the displacement frequency of the moveable blade 321 may thus be increased.

Advantageously, in the presence of the elastic return element 323, the actuation device 1 may then comprise an abutment limiting the displacement of the driving portion 32 along the second sense. This is advantageous for a driving of the element to be driven 9 on the return of the driving portion 32 when the power supply voltage is cut off. Indeed, this gives the possibility of ensuring that the driving force is sufficient for displacing the element to be driven 9 through the drive element 2 during the whole displacement of the moveable blade 321 along the second sense.

The driving portion 32 may comprise a gantry 322, 323 with a support 322 on which the moveable blade 321 is attached through its bound end. The elastic return element 323 may be an arm of the gantry having rigidity. The drive element 2 is either bound to the support 322, or to the arm. Thus, when a sufficient power supply voltage is applied, the moveable blade 321 moves closer to the crawling surface 311 while deforming in order to allow generation of the contact area and of the crawling front. The moveable blade 321 then carries away the gantry 322, 323 with it and therefore the drive element 2 in a displacement direction along the first displacement sense. During this time, the arm stores energy. When the power supply voltage is cut off or becomes insufficient, the arm exerts a return force on the moveable blade 321 generated from the stored energy forcing the moveable blade 321 to reassume its initial shape and position.

The fixed portion 31 may comprise a fixed frame, one face of which forms the crawling surface 311. Alternatively, the fixed portion 31 may comprise a balk 312, the crawling surface 311 then being formed on one of the longitudinal faces of the balk 312.

The crawling surface 311 is preferably selected to be larger than the moveable blade 311 at their overlapping.

In the case when the fixed portion 31 comprises a balk 312 on which the crawling surface 311 is formed, the latter may be flexible so that when a power supply voltage is applied between the moveable blade 321 and the crawling surface 311, the balk 312 moves closer to the moveable blade 321.

The flexibility of the balk then gives the possibility of lowering the minimum power supply voltage required for allowing the crawling surface 311 and the moveable blade 321 to move closer to each other and to come into contact by the spontaneous reduction in the distance separating the crawling surface 311 and the moveable blade 321.

Moreover, this allows a reduction in the bulkiness of the fixed portion 31 of the actuation element 3. Indeed, a flexible balk 312 is thinner than a fixed frame, for a given material.

The fixed portion 31 may include a plurality of balks 312 (which may be flexible) (see FIGS. 2 to 5). In this case, the fixed portion 31 also comprises a gantry 313 on which the balks 312 are connected. Each of the balks 312 has a crawling surface 311. The driving portion also includes a plurality of moveable blades 321 connected to a moveable gantry 322, 323 as described above. The plurality of balks 312 and the plurality of moveable blades 321 are positioned relatively to each other so as to form an assembly of interdigitated combs.

This reduction of balks 312 and of moveable blades 321 gives the possibility of increasing the driving force generated by the actuation device 1 while the displacement remains identical to the case of a single balk 312 and of a single moveable blade 321.

The drive element 2 generally comprises a finger 23 having at least one meshing surface 231. The meshing surface 231 is intended to be put into contact with the notches 91 of the rack device 9 or with the teeth 91 of the toothed wheel 9 for meshing the drive element 2 with the element to be driven 9. This meshing surface 231 has a geometry mating a drive surface 911 of the notches or teeth through which the notches or the teeth are pulled or pushed.

The drive element 2 may comprise a first beam 21 parallel to the first displacement direction of the driving portion 32 and for which a first end 211 is connected to the driving portion 32 (for example to the moveable gantry) and a second end 212 is connected to the finger 23. Thus, the displacement of the driving portion 32 along the first direction causes displacement of the drive element 2 along the same first direction. The finger 23 therefore displaces the element to be driven 9 along this direction.

The drive element 2 may further comprise one second beam 22 also parallel to the first direction. The second beam 22 includes a first fixed end 221 and a second end 222 connected to the finger 23. In this case, the displacement of the moveable blade 321 leads to a displacement of the driving portion 32 along the first direction, which causes bending of both beams 21, 22, and causes displacement of the finger 23 along a second direction perpendicular to the first direction.

Thus, the finger 23 may be displaced along either one of the two directions. For example, along the first direction, the drive element 2 drives the element to be driven 9 in its movement by its engagement with the latter. Along the second direction, the drive element 2 disengages from the element to be driven 9, it is thus disengaged.

In order to perform the displacements of the finger 23 along both directions, two actuation devices 1D, 1E are required (see FIG. 5), a single finger 23 is shared among the driving elements 2D, 2E of the actuation devices: a first actuation device 1E ensuring the displacement of the finger 23 along the first direction and a second actuation device 1D ensuring the disengagement of the finger 23 along the second direction. The other elements of these actuation devices 1D, 1E may be the same of those of the actuation device 1 described above and later on below. The letter E is used for identifying in FIG. 5 the elements of the actuation device acting as a drive, and the letter D for the elements of the actuation device acting as a disengagement function.

In this case, a control 7 is provided for simultaneously controlling both actuation devices 1D, 1E, so that:
  in a first phase, the first actuation device 1E moves the finger 23 along the first direction and in a first sense;
  in a second phase, the second actuation device 1D moves the finger 23 along the second direction and in a first sense;
  in a third phase, the first actuation device 1E moves the finger 23 along the first direction and in a second sense;
  in a second phase, the second actuation device 1D moves the finger 23 along the second direction and in a second sense.

The disengagement function also allows the making of an assembly for driving the element to be driven 9 along two drive senses.

In a first alternative (FIG. 5), the assembly comprises a first actuation device 1E for achieving the function for driving the element to be driven 9 and a second actuation device 1D for achieving the disengagement function of the finger 23. A single finger 23 is shared among the driving elements 2E, 2D of the actuation devices.

A control 7 is then provided for adjusting the assembly on a first or second operating mode.

In the first operating mode, the control 7 then acts on both actuation devices 1E, 1D iteratively so that:

in a first phase, the second actuation device 1D meshes with the element to be driven 9 by the finger 23 by means of its drive element 2D;

in a second phase, the driving portion 32E of the first actuation device 1E drives the element to be driven 9 in a first driving sense when it moves along the first displacement sense;

in a third phase, the finger 23 is disengaged by the drive element 2D of the second actuation device; and in a fourth phase, the driving portion 32E of the first device 1E moves along the second displacement sense by means of its elastic return element 323E.

In the second operating mode, the control 7 then acts on both actuation devices 1E, 1D iteratively so that:

in a first phase, the second actuation device 1D meshes with the element to be driven 9 by the finger 23 by means of its driving element 2D;

in a second phase, the driving portion 32E of the first actuation device 1E drives the element to be driven 9 in a second driving sense when it is moved along the second displacement sense by means of its elastic return element 323E;

in a third phase, the finger 23 is disengaged by means of the drive element 2D of the second actuation device 1D; and in a fourth phase, the driving portion 32E of the first drive device 1E moves along the first displacement sense.

Figure 6:
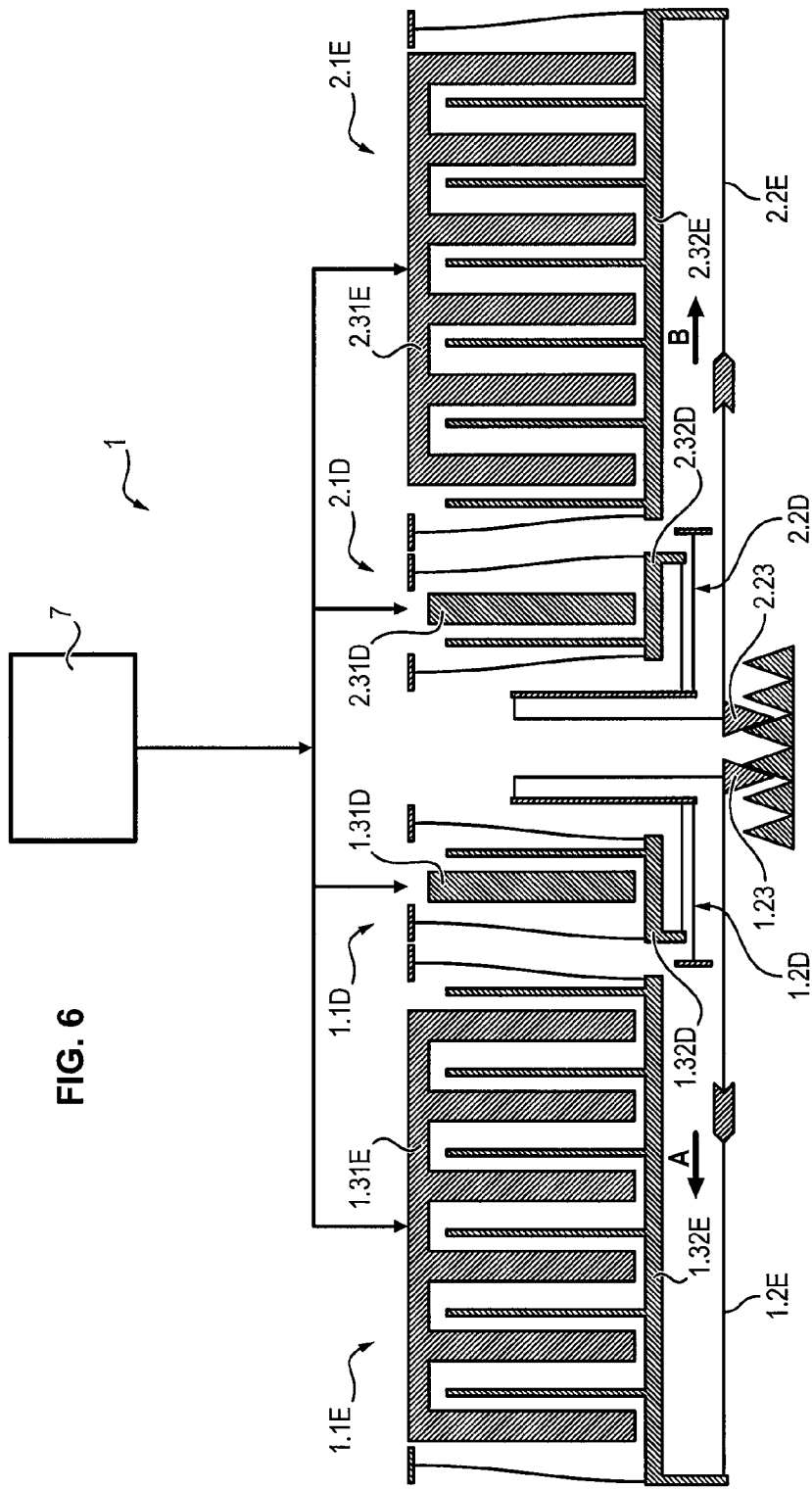
FIG. 6 is a schematized illustration of a drive assembly comprising four actuation devices laid out pairwise, one allowing the displacement of the element to be driven along a first drive sense and the second one allowing displacement of the element to be driven along a second drive sense opposite to the first drive sense.

In a second alternative (FIG. 6), the assembly comprises four actuation devices positioned pairwise: a first pair (for which the elements are referenced by <<1.--->> in FIG. 6) for driving the element to be driven 9 along a first drive sense (arrow A) and a second pair (for which the elements are referenced by <<2.--->> in FIG. 6) for driving the element to be driven 9 along a second drive sense (arrow B) opposite to the first drive sense.

Each pair comprises a first actuation device (the elements of which are referenced by << --.---E>> in FIG. 6) for the drive function and a second actuation device (for which the elements are referenced by <<--.---D>> in FIG. 6) for the disengagement function. A single finger 1.23, 2.23 is shared between the drive elements of the actuation devices of a pair.

A control 7 is provided for adjusting the assembly on a first or second operating mode.

In a first operating mode, only the first pair acts on the element to be driven. The first actuation device corresponding to this first pair causes the element to be driven while its driving portion moves along the first displacement sense or the second displacement sense.

In a second operating mode, only the second pair acts on the elements to be driven. The first actuation device corresponding to the second pair causes the element to be driven when its driving portion is displaced along the first displacement sense or the second displacement sense.

Moreover, while the amplitude of the displacement along the first direction is defined by the air gap E between the moveable blade 321 and the crawling surface 311, the amplitude of the displacement along the second direction is both defined by the air gap E between the moveable blade 321 and the crawling surface 311 and by the gap found between the first beam 21 and the second beam 22. For the same air gap E, the closer are the first beam 21 and the second beam 22, and the larger is the amplitude of the displacement along the second direction. The amplitude along the second direction is easily several times larger than that along the first direction. The step of the element to be driven 9 may then be greater than the amplitude of the displacement along the first direction defined by the air gap E between the moveable blade 321 and the crawling surface 311.

Thus, it is possible to obtain a larger displacement of the element to be driven 9 along this second direction if the drive element 2 is configured for displacing the element to be driven along the latter.

For example (see FIG. 3), the drive element 2 further comprises a third beam 24 substantially perpendicular to the first direction, and a first end 241 of which is connected to the first beam 21 and to the second beam 22, and a second end 242 is connected to the finger 23. In this case, a displacement of the driving portion 32 along the first direction causes bending of the first beam 21 and of the second beam 22, which causes a displacement of the drive element 2 along the second direction.

This last situation is related to the possible incompatibility between the minimum step which may be made with micro-manufacturing technologies (generally greater than 15 μm, but depending on the thickness of the device and on the shape of the teeth) and the maximum air gap acceptable for generating a sufficient driving force (in general less than 15 μm, but depending on the need for driving force and on the maximum allowed power supply voltage). This incompatibility is circumvented by using displacement of the finger 22 along the second direction.

The actuation device 1 described above is advantageously used in the manufacturing of mechanisms for watches or clocks, notably quartz mechanisms. The flexibility of the moveable blades 321 and the mechanism for propagating the crawling front resulting from it give the possibility of generating a driving force much greater than the one from the prior art.

Moreover, when the actuation device 1 comprises an elastic return element 323, it is possible to transfer the entirety of this available driving force. Also, when the fixed portion 31 has a plurality of balks 312 and the driving portion 32 a plurality of moveable blades 321, the driving force of a moveable blade 321 accumulates with those of the others. The generated driving force and which may be transferred to the drive element 2, is then larger.

The possibility of accumulating the driving forces of a plurality of moveable blades 321, moreover all the parameters being equal, may be utilized for reducing the power supply voltage required in a clock mechanism, i.e. down to 30 V for example; while for actuation devices of the prior art, the required power supply voltage is of about 100 V. Reduction in the power supply voltage directly and very substantially increases the autonomy of watch or clock mechanisms.

Indeed, the presently available batteries generally provide a voltage comprised between 1.5 V and 3 V. These voltages are less than the power supply voltage required by the electrostatic actuation devices which then require an intermediate system for raising the voltage provided by the batteries up to the level of the power supply voltage. The larger the required raising factor and the larger is the energy consumption of the raising system, which therefore reduces the autonomy of the mechanisms of watches or clocks. By reducing the power supply voltage of the electrostatic actuation devices, it is then possible to increase the autonomy of the mechanisms of watches or clocks in which they are integrated.

Mounting Method with Catching Up of an Etching Play

A method for mounting an actuation device as mentioned above is described here with reference to FIG. 7.

This method comprises a step for etching the driving portion 32, the fixed portion 31 and a holding element 4. The driving portion 32 is etched so that it has to appear in the operating position of the actuation device 1. The fixed portion 31 is etched in a so-called initial position so that the crawling surface 311 is located at an etching distance Go of the moveable blade 321 facing each other. The fixed portion 31 also comprises an abutment 314 and an elastic element 315 with stiffness k for connecting to the frame 6.

The holding element 4 is formed with at least one abutment 41 capable of being engaged in order to displace the fixed portion 31 from its initial position in its operating position and block it in this last position. The amplitude of this displacement is determined by a positioning abutment 5 located at a displacement distance B from the fixed portion 31. The difference between the etching distance and the displacement distance ($G_0$–B) defines the air gap E which separates during operation the moveable blade 321 and the crawling surface 311. The holding element 4 also comprises an elastic element 42 for connecting to the frame of stiffness K greater than the stiffness k of the elastic connecting element 315 of the fixed portion. The stiffness K of the elastic connecting element 42 of the holding element is selected so as to allow holding of the fixed portion 31 in the operating position and prevent the return of the latter to its initial position.

The condition for holding the fixed portion 31 against the positioning abutment 5 may be written in the following way: K×(P–B)>k×B. The force difference K×(P–B)–k×B then determines the holding force of the fixed portion against the positioning abutment, P designating the distance between the abutment 314 of the fixed portion and the abutment 41 of the holding element in the initial position of the fixed portion.

The method also comprises the displacement of the holding element 4 until its abutment 41 is engaged with the abutment 314 of the fixed portion thereby causing displacement of the fixed portion 31 against the positioning abutment 5.

With this method it is possible to overcome the technological limits inherent to etching on a silicon substrate. Indeed, it may be of interest to design an actuation device 1, for which the driving portion 32 and the fixed portion 31 are separated by an air gap E less than the resolution of the etching. For this, the driving portion 32 and the fixed portion 31 are first etched so as to have an air gap Go greater than or equal to the resolution of the etching. Next, by displacement of the fixed portion 31 towards the positioning abutment 5 and its blocking by means of the holding element 4, the final air gap E obtained in the operating position is less than the resolution of the etching.

For example, an initial distance Go of 30 µm facilitates etching of the various constitutive elements. With the mounting method, it is possible by a positioning abutment 5 placed at a distance B of 25 µm to reduce the operating distance to 5 µm; a distance which would not be accessible by direct etching.

Example 1

In this Example 1, the actuation device comprises a drive element able to be put into contact with the element to be driven, and an actuation element made in single-crystal silicon. The actuation element includes a fixed portion comprising a balk, a face of which forms a crawling surface with a width of 50 µm, and a driving portion comprising a flexible moveable blade with a length of 1,500 µm, positioned in parallel and facing the crawling surface forming with the latter an air gap of 15 µm. In order to allow formation of a crawling front, the width of the moveable blade is 7 µm. The actuation device has a width of 90 µm.

When operating, a power supply voltage of 50 V is applied.

The generated available driving force is then 170 µN. The driving force was obtained by simulation with the software package ANSYS™.

Comparative Example 1

In this Comparative Example 1, an actuation device according to the prior art is evaluated relatively to Example 1.

This actuation device comprises a driving element able to be put into contact with the element to be driven, and an actuation element made in single-crystal silicon. The actuation element includes a fixed portion comprising a beam, one face of which forms a contact surface with a width of 50 µm, and a driving portion comprising a rigid moveable blade with a length of 1,500 µm, positioned parallel and facing the contact surface forming with the latter an air gap of 15 µm. As the moveable blade is rigid, the width of the latter is not an important parameter. It is generally selected to be on the same order as the width of the balk. The actuation device has a width of 190 µm.

When operating, a power supply voltage of 50 V is applied.

The generated available driving force is then 14 µN. The driving force was determined by means of the following formula:

$$F_{driving\ force} = \frac{1}{2} \cdot \frac{\varepsilon_0 \cdot \varepsilon_1^2 \cdot S}{((g-\Delta) \cdot \varepsilon_1 + h_1 \cdot \varepsilon_0)^2} \cdot V^2;$$

wherein $\varepsilon_0$ and $\varepsilon_1$ are the respective permittivities of air and of the layer of insulating material deposited on the contact surface and the surface of the rigid moveable blade; S is the area facing the moveable blade and the contact surface, i.e. the area of their overlapping; V is the potential difference between the contact surface and the rigid moveable blade, g is the initial distance between the rigid moveable blade and the contact surface, hi is the total thickness of insulating material layers facing each other and $\Delta$ is the current displacement of the moveable portion.

Thus, the available driving force generated by Example 1 is 12 times greater than the one generated by Comparative Example 1.

Moreover, in order that this Comparative Example 1 generates the same driving force (i.e. 170 µN), a power supply voltage of 174 V will have to be applied. Indeed, the driving force is directly proportional to the square of the power supply voltage. Thus, the formula giving the power supply voltage required for obtaining a unit driving force of 170 µN is:

Required voltage=50 V·$(170/14)^{1/2}$=174 V.

The gain in voltage of Example 1 relatively to the Comparative Example 1 is then of the order of 3.5.

Finally, the width of the actuation device of Example 1 is close to twice less than that of the actuation device of Comparative Example 1.

Finally, the gain of driving force per surface unit is then 2×12=24.

Example 2

In this Example 2, the actuation device 1 comprises an actuation element 3 made in single-crystal silicon. The actuation element includes a fixed portion 31 comprising a crawling surface 311, and a driving portion 32 comprising a flexible moveable blade 321 positioned in parallel and facing the crawling surface 311 forming with the latter an air gap E. The driving portion 32 further comprises a gantry consisting of a support 322 to which the flexible moveable blade 321 is attached through one of its ends 3212, and two arms 323 and an end of which is bound to the support and the other one to the frame 6.

The dimensioning of the crawling surface 311, of the moveable blade 321 and of the air gap E is identical with Example 1.

For the needs of this Example (See FIG. 8), a weight (resistant load) is attached to the support of the gantry. The weight then exerts a force $F_{ext}$ collinear with the displacement of the driving portion 32 and in the sense opposite to the sense for bringing the moveable blade 321 closer to the crawling surface 311. An abutment 7 is positioned in contact with the gantry 322 so that the latter does not bend because of the weight 8.

The power supply voltage is set to 50 V.

The maximum resistant load which may be driven over the entirety of the displacement is then 170 μN.

Comparative Example 2

In this Comparative Example 2, an actuation device 01 according to the prior art is evaluated relatively to Example 2.

This actuation device 01 comprises an actuation element 03 made in single-crystal silicon. The actuation element 03 includes a fixed portion 031 comprising a contact surface 0311 and a driving portion 032 comprising a moveable blade 0321 positioned in parallel and facing the contact surface 0311 forming with the latter an air gap 0E. The moveable blade 0321 comprises a free end 03211 and an end 03212 fitted into the frame, i.e. attached to the frame.

The dimensioning of the contact surface 0311, of the moveable blade 0321 and of the air gap 0E is identical with Comparative Example 1.

For the purposes of this Comparative Example 2 (see FIG. 9), a weight 08 (resistant load) is attached to the free end 03211 of the moveable blade 0321. The weight 08 then exerts a force $F_{ext}$ collinear with the displacement of the driving portion 032 and in the sense opposite to the sense for bringing the moveable blade 0321 closer to the contact surface 0311. An abutment 07 is positioned in contact with the moveable blade 0321 near its free end 03211 so that the latter does not bend because of the weight 08.

The power supply voltage is set to 50 V.

The maximum resistant load which may be driven over the entirety of the displacement is then 4 μN.

Moreover, in order that this Comparative Example 2 generates the same driving force (i.e. 170 μN), a power supply voltage of 175 V would have to be applied.

The gain in voltage of Example 2 relatively the comparative example 2 is then of the order of 3.5. Considering the fact that the driving force is proportional to the square of the power supply voltage, the gain in driving force is of the order of 12.

Comparative Example 3

In this Comparative Example 3, the actuation device is the same as the one of Comparative Example 2, with the exception of the following.

The contact surface is configured so as not to be parallel to the moveable blade. The contact surface is as close as possible to the moveable blade on the side of its fitted end. The distance between the contact surface and the moveable blade at the free end of the latter is the same as the air gap of Comparative Example 2.

The power supply voltage is set to 50 V.

The maximum resistant load which may be driven over the entirety of the displacement is then 12 μN.

Moreover, in order that this Comparative Example 3 generates the same driving force (i.e. 170 μN), a power supply voltage of 80 V would have to be applied.

The gain in voltage of Example 2 relatively to Comparative Example 3 is then of the order of 1.6.

Example 3

In this Example 3, the dimensions of the flexible moveable blade are given in the Table 2 below:

TABLE 2

| Width (μm)/generated driving force (μN) | | Power supply voltage (V) | | | |
|---|---|---|---|---|---|
| | | 40 | 60 | 80 | 100 |
| Length (μm)/Air gap (μm) | 1000/5 | 11/660 | 15/1540 | 18/2720 | 21/4270 |
| | 1500/5 | 20/1040 | 26/2330 | 32/4190 | 37/6540 |
| | 1000/15 | 4/180 | 5/390 | 6/690 | 7/1090 |
| | 1500/15 | 7/280 | 9/610 | 11/1090 | 13/1730 |

These moveable blades have sufficient flexibility so that a crawling front is formed and propagates over the crawling surface.

The invention claimed is:

1. An actuation device for setting into motion an element to be driven, comprising:
    a drive element able to be put into contact with the element to be driven; and
    an actuation element comprising a fixed portion and a driving portion for the drive element;
    wherein the fixed portion includes a crawling surface, the driving portion includes a flexible moveable blade with a given width positioned in parallel and at a distance from the crawling surface, the moveable blade having a free end and an end connected to the drive element;
    wherein the moveable blade has a length which is selected so that, when a power supply voltage is applied between the moveable blade and the crawling surface, the free end will come into contact with the crawling surface and a contact area, between the moveable blade and the crawling surface, longitudinally delimited relatively to the moveable blade by the free end of the moveable blade and a crawling front, increases by propagation of the crawling front along the moveable blade, the propagation of the crawling front moving the moveable blade according to a first orientation, thus driving the drive element.

2. The actuation device according to claim 1, wherein the fixed portion comprises a flexible balk having the crawling surface, so that when a power supply voltage is applied between the moveable blade and the crawling surface, the balk moves closer to the moveable blade.

3. The actuation device according to claim 1, wherein the driving portion further comprises an elastic return element connected to the moveable blade and to a frame of the actuation device, the moveable blade being able to be displaced along a first displacement sense according the first orientation by propagation of the crawling front under the effect of the power supply voltage, and according to a second displacement sense according to the first orientation, opposite to the first displacement sense, under the effect of a return force generated by the elastic return element, so as to generate a reciprocal movement of the drive element.

4. The actuation device according to claim 3, further comprising an abutment limiting the displacement of the driving portion along the second sense.

5. The actuation device according to claim 1, wherein the fixed portion, includes a fixed gantry and a balk attached to the fixed gantry, the balk having the crawling surface,
wherein the driving portion includes a moveable gantry and a moveable blade attached to the moveable gantry through one of its ends.

6. The actuation device according to claim 5, wherein the fixed portion includes a plurality of balks attached to the fixed gantry, each of the balks having a crawling surface,
wherein the driving portion comprises a plurality of moveable blades attached to the moveable gantry, and
wherein the plurality of balks and the plurality of moveable blades are positioned relatively to each other so as to form an assembly of interdigitating combs.

7. The actuation device according to claim 5, wherein the moveable gantry comprises a support to which are attached the moveable blades and at least one arm connecting the support to a frame of the actuation device.

8. The actuation device according to claim 7, wherein the arm of the moveable gantry forms an elastic return element connected to the moveable blade and to a frame of the actuation device,
the moveable blade being able to be displaced along a first displacement sense according the first orientation by propagation of the crawling front under the effect of the power supply voltage, and
according to a second displacement sense according to the first orientation, opposite to the first displacement sense, under the effect of a return force generated by the elastic return element, so as to generate a reciprocal movement of the drive element.

9. The actuation device according to claim 5, wherein the drive element further comprises first and second beams,
the first beam including a first end connected to the moveable gantry and a second end connected to the drive element; and
the second beam including a first fixed end and a second end connected to the driving element;
so that the displacement of the moveable blades generates bending of both beams causing the displacement of the drive element according to a second orientation perpendicular to the first orientation.

10. The actuation device according to one of claim 1, wherein, for a given width of the moveable blade and a given power supply voltage, the moveable blade has a length which is equal to the minimum length required for allowing formation of the crawling front.

11. The actuation device according to claim 1, wherein, for a given length of the moveable blade and a given power supply voltage, the moveable blade has a width which is equal to the maximum width allowing formation of the crawling front.

12. A method for mounting an actuation device according to claim 1, comprising steps of:
etching, in a block of semi-conducting material, the driving portion in the operating position, the fixed portion of the actuation element in a so-called initial position, a holding element comprising at least one abutment able to be engaged in order to displace and block the fixed portion in its operating position and a positioning abutment;
displacing the holding element until its abutment is engaged with the fixed portion thereby causing displacement of the fixed portion against the positioning abutment.

13. An actuation assembly comprising a first actuation device and a second actuation device, each of the first and second actuation device comprising:
a drive element able to be put into contact with the element to be driven; and
an actuation element comprising a fixed portion and a driving portion for the drive element;
wherein the fixed portion includes a crawling surface, the driving portion includes a flexible moveable blade with a given width positioned in parallel and at a distance from the crawling surface, the moveable blade having a free end and an end connected to the drive element;
wherein the moveable blade has a length which is selected so that, when a power supply voltage is applied between the moveable blade and the crawling surface, the free end will come into contact with the crawling surface and a contact area, between the moveable blade and the crawling surface, longitudinally delimited relatively to the moveable blade by the free end of the moveable blade and a crawling front, increases by propagation of the crawling front along the moveable blade, the propagation of the crawling front moving the moveable blade according to a first orientation, thus driving the drive element
the first actuation device and the second actuation device sharing a single and same finger,
the first actuation device being able to displace the finger according to a first orientation and the second actuation device being able to displace the finger according to a second orientation; and
the assembly further comprising a control simultaneously driving both actuation devices, so that:
in a first phase, the first actuation device displaces the finger according to the first orientation and in a first sense;
in a second phase, the second actuation device displaces the finger according to a second orientation and in a first sense;
in a third phase, the first actuation device displaces the finger according to the first orientation and in a second sense;
in a second phase, the second actuation device displaces the finger according to the second orientation and in a second sense.

* * * * *